United States Patent [19]

Kimura

[11] 4,183,012
[45] Jan. 8, 1980

[54] ABRASION ALARM DEVICE FOR DISK BRAKE

[75] Inventor: Ryoichi Kimura, Itami, Japan

[73] Assignee: Sumitomo Electric Industries, Ltd., Osaka, Japan

[21] Appl. No.: 930,270

[22] Filed: Aug. 2, 1978

[30] Foreign Application Priority Data

Aug. 2, 1977 [JP] Japan ............................ 52-104173[U]

[51] Int. Cl.² .............................................. B60T 17/22
[52] U.S. Cl. ................................. 340/52 A; 200/61.44; 188/1 A
[58] Field of Search ............................ 340/52 A, 52 B; 200/61.4, 61.44; 188/1 A

[56] References Cited

U.S. PATENT DOCUMENTS

| 3,893,543 | 7/1975 | Sibatani et al. | 340/52 A |
| 3,986,164 | 10/1976 | Hirai et al. | 340/52 A |

Primary Examiner—Alvin H. Waring
Attorney, Agent, or Firm—Sughrue, Rothwell, Mion, Zinn and Macpeak

[57] ABSTRACT

An electrical contact is embedded in an insulator which, in turn, is fitted onto the disk side of the backing plate on a disk pad. When the pad wears excessively the insulator is worn away and the contact abuts the disk so that an alarm signal may be generated. Further wear will cause the disk to abrade and break the contact. The contact assembly is compact and enters the brake assembly through a vent hole which is typically provided therein.

5 Claims, 11 Drawing Figures

FIG. 3a
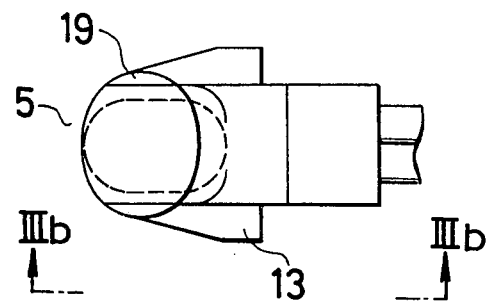
FIG. 3d
FIG. 3b
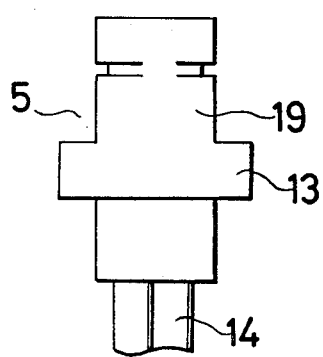
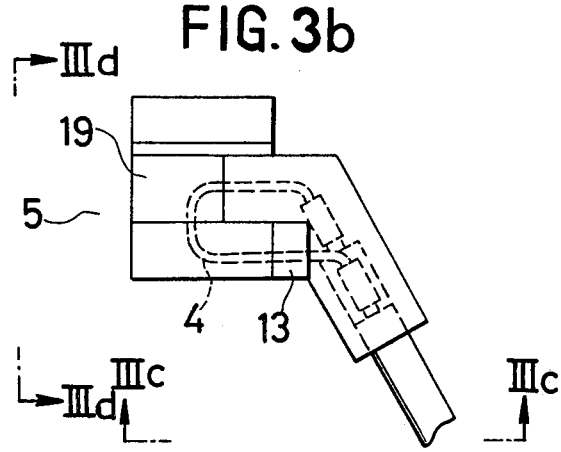
FIG. 3c
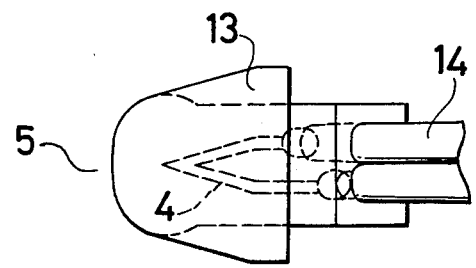

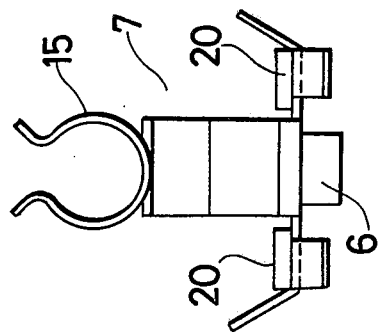
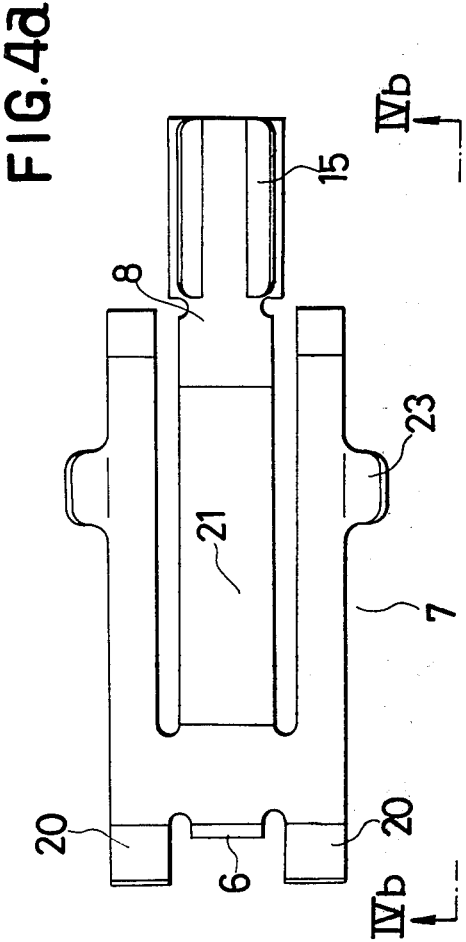
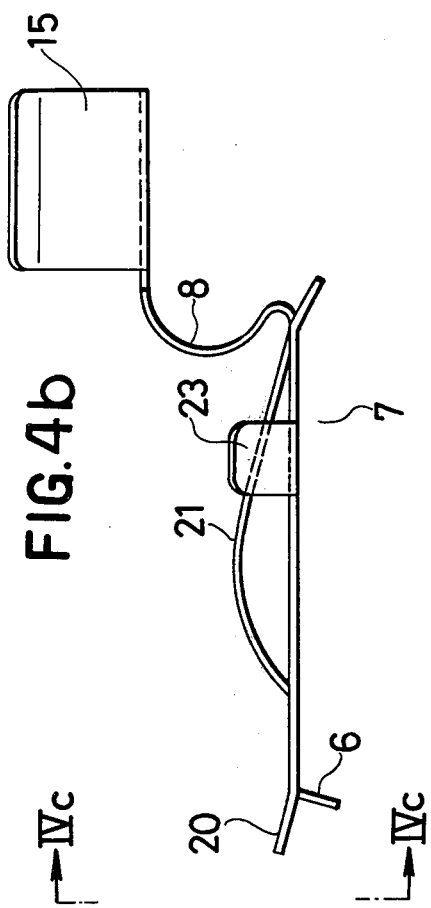

ABRASION ALARM DEVICE FOR DISK BRAKE

BACKGROUND OF THE INVENTION

This invention relates to an abrasion alarm device for a pad which is abutted by a floating caliper in a floating type disk brake, and intends more particularly to provide an abrasion alarm device which can be readily mounted on and removed from the pad and in which the lead wires for alarm can be readily held.

It is desirable to be able to detect excessive brake wear prior to the point at which brake failure and/or brake damage occurs. Mechanical audible brake wear detectors have been widely used but are sometimes not heard by the driver and, therefore, it is preferable to provide an electrical signal for a visual display or audible alarm within the passenger compartment. However, it is difficult to connect the necessary electrical equipment to a confined space such as a disk brake assembly.

SUMMARY OF THE INVENTION

Accordingly, it is an object of this invention to provide an easily installable and removable abrasion alarm device.

Briefly, in accordance with the present invention, this is accomplished by connecting the conductors from two lead wires into a loop and embedding them in a molded insulator material. The molding piece is inserted into the brake pad backing plate and extends to the disk side thereof so that upon excessive pad wear the molding will be worn away to provide electrical contact between the conductors and disk and upon further wear the conductors will be abraded and broken. The molding piece is held in place by a spring which also protects the lead wires from the heat generated by the brake disk.

BRIEF DESCRIPTION OF THE DRAWINGS

The preferred embodiment of this invention will now be described with reference to the drawing, in which:

FIG. 3(a) is front view of the alarm probe; i.e., viewed from the left side of FIG. 1;

FIG. 3(b) is a side view along line IIIb—IIIb of FIG. 3(a);

FIG. 3(c) is a rear view along line IIIc—IIIc of FIG. 3(b);

FIG. 3(d) is a bottom view along line IIId—IIId of FIG. 3(c);

FIG. 4(a) is a top plan view of the spring member 7 of FIG. 2;

FIG. 4(b) is a side view along line IVb—IVb of FIG. 4(a);

FIG. 4(c) is a front view along line IVc—IVc of FIG. 4(b);

DETAILED DESCRIPTION OF THE INVENTION

Figure 1:
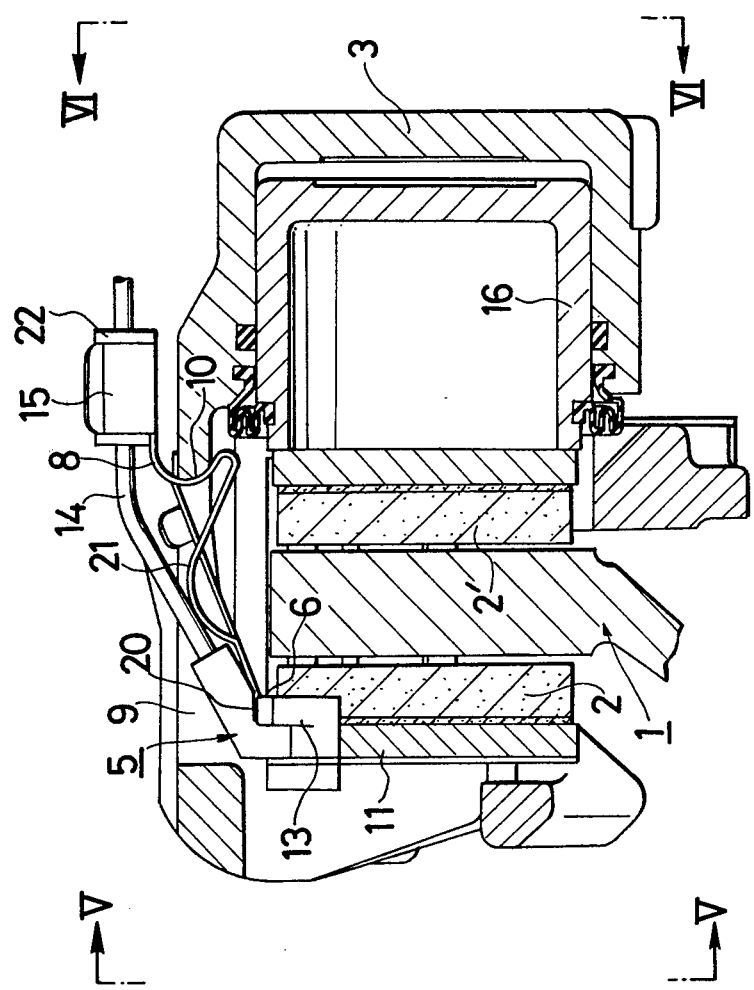
FIG. 1 is a part sectional view of a disk brake assembly provided with the alarm device according to the present invention.
Figure 2:
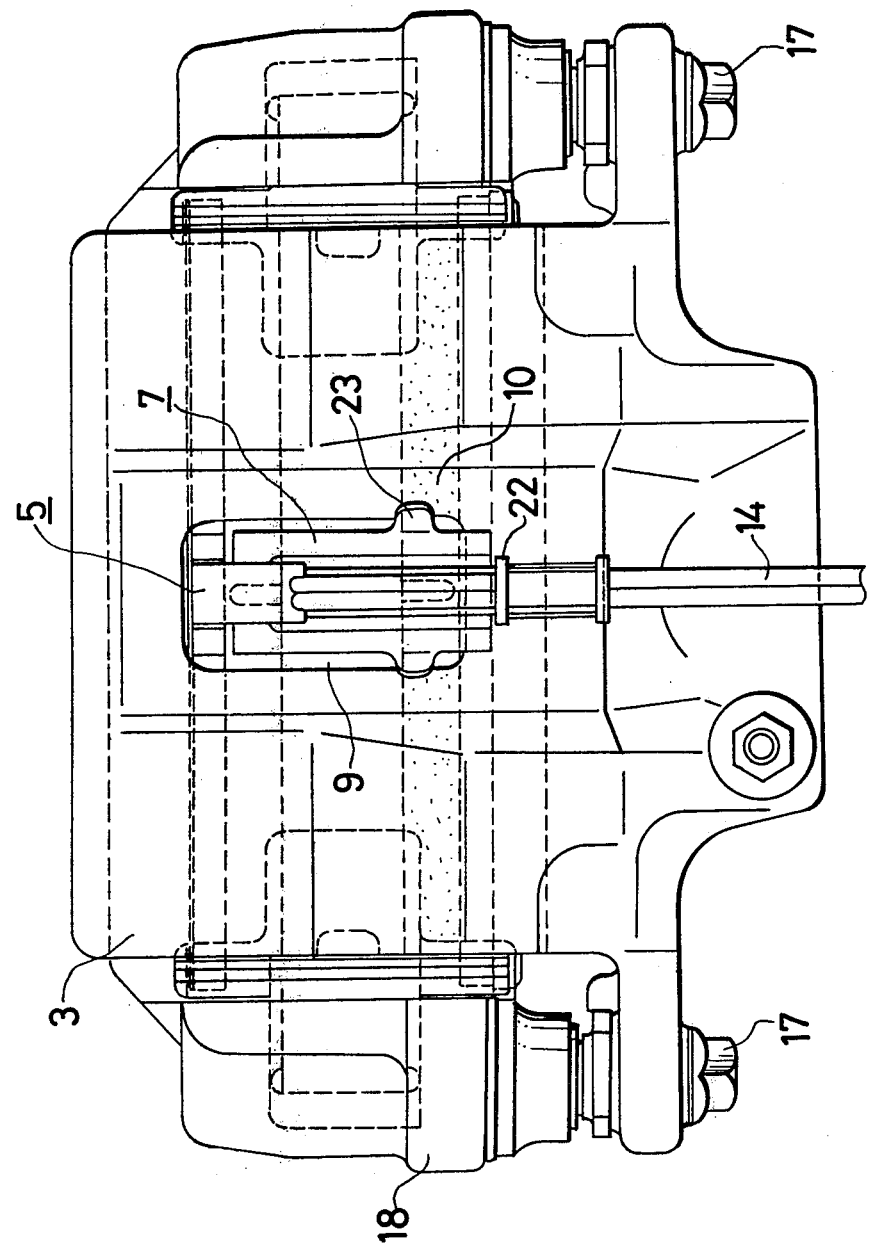
FIG. 2 is a top plan view of the assembly in FIG. 1.

In general, in a floating type disk brake, as shown in FIG. 1, a pad 2' on the right-hand side of a disk 1 is abutted against the disk braking surface by means of a piston 16 provided in a caliper 3, as a result of which the caliper is moved right by the reaction of the abutment to cause a pad 2 on the left-hand side of the disk to abut against the disk braking surface, thus achieving the braking action. Referring to FIG. 2, two pins (not shown in FIG. 2 since they are behind the components) affixed to the caliper by bolts 17 are supported slidably in the direction of the disk axis whereby the caliper is supported in such a manner as to be able to move in the direction of the disk axis. In most of the disk brakes, a window hole 9 is provided in a portion of the caliper 3 which extends over the disk in order to minimize the temperature rise caused by the frictional heat of the disk.

Figure 5:
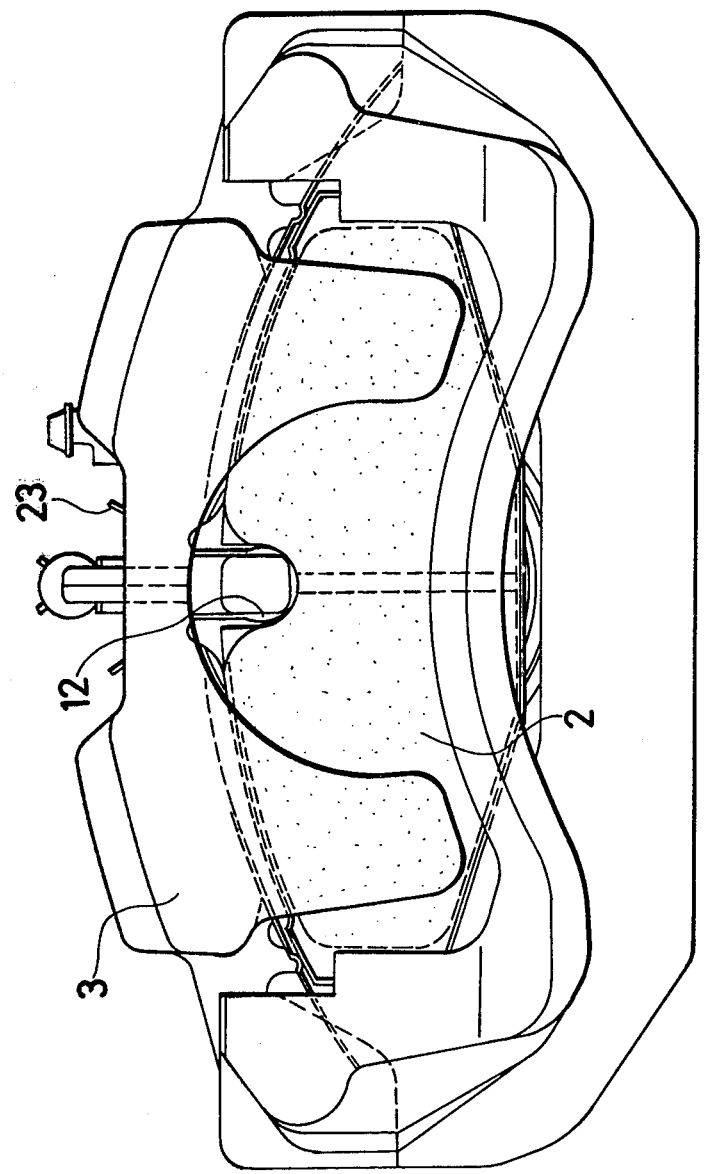
FIG. 5 is a view along line V—V of FIG. 1.
Figure 6:
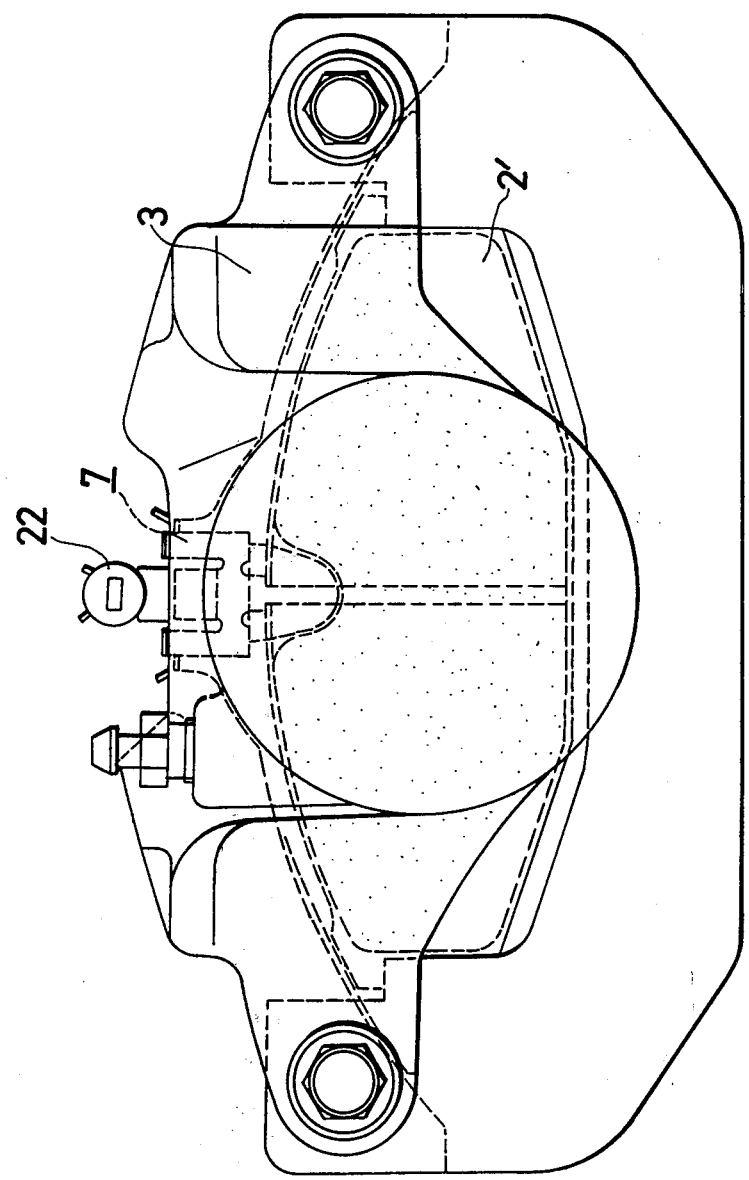
FIG. 6 is a view along line VI—VI of FIG. 1.

This invention provides an abrasion alarm device for the pad 2 which is abutted against the caliper by utilizing the window hole 9. The abrasion alarm device is as shown most clearly in FIGS. 3(a)–3(d) and a spring member 7 as shown most clearly in FIGS. 4(a)–4(c). Referring to FIG. 3, the end portions of lead wires 14 obtained from insulated parallel conductors are connected in the form of a loop through a conductor wire 4 as shown in FIGS. 3(b) and 3(c). The lead wires and a part of the electric wire 4 are molded into an organic or inorganic insulating material to form the probe 5. The fitting part 19 of the molded section is fitted into a hole 12 (FIG. 5) provided in the pad rear plate 11 has a diameter smaller than the width of the hole 12 cut in the rear plate. Therefore, the fitting part 19 is affixed to the rear plate by introducing the end of the fitting part from the disk side of the rear plate 11. A flange 13 is provided on the lead wire side of the fitting part 19. The side surface of the flange 13 is elastically abutted against the rear plate by means of a depressing part of the spring member described later. The position of the lower part of wire 4 (as shown in FIG. 3(b)) is so selected as to define the use limit thickness of the pad. Accordingly, when the abrasion of the pad is increased, the insulated molding material is abraded by the disk until the wire is brought into contact with the rotating disk, that is, the wire is elecrtrically connected to the disk, and finally the wire is abraded and broken by the rotating disk. By utilizing first the electrical connection and then the wire breakage, the degree of abrasion of the pad can be detected to give an alarm by means of an electrical circuit well known in the art.

The spring member 7, as shown in FIG. 4, is made of a sheet of stainless or spring steel plate, and has the aforementioned depressing part 6 and two auxiliary depressing parts 20 at the one end portion thereof. Extended from this end portion are three arms. The central arm is provided with a curved elastic part 21, an elastically locking part 8, and a holding part 15, as shown in FIG. 4(b). The elastically locking part 8, as shown in FIG. 1, is elastically locked with the edge 10 of the window hole 9, and the probe 5 is elastically locked with the rear plate 11 with the aid of the elastic force of the curved elastic part 21. The section of the holding part 15 is in the form of a letter Q. The lead wire 14 is elastically held through a bushing 22 by the holding part 15. As is apparent from FIG. 2, the aforementioned curved elastic part 21 is extends below (on the disk side) the portion of the lead wire which runs in the vicinity of the window hole 9 so as to protect the lead wire from the high temperature heat radiated from the disk.

The two arms extended on both sides of the central arm are symmetrical with respect to the axis of the central arm, and have ear parts 23 which are elastically engaged with the edges, in the disk's circumferential direction, of the window hole 9, as shown in FIG. 2.

Since the abrasion alarm device according to this invention is constructed as described above, it can be readily provided even in a narrow location as in the case of a disk brake mounted on a wheel. This is considerably effective and convenient in practical use.

What is claimed is:

1. An abrasion alarm device for a disk brake of the type having a window hole in a floating caliper, said alarm being of the type which is mounted on a floating caliper which is moved in the axial direction of a brake disk to cause a frictional pad on one side of the disk to abut against a disk braking surface, and which gives an alarm upon excessive abrasion of the frictional pad, wherein the improvement is characterized in that said abrasion alarm device comprises:
    a probe having an electric wire for generating an electrical signal through frictional engagement with the disk braking surface; and
    a spring member having a depressing part adapted to elastically abut said probe in such a manner that said probe is moved away from said disk, said spring member being elastically locked with an edge of said window hole formed outside said disk and in said floating caliper by an elastically locking part of said spring member which acts in opposition to said depressing part.

2. An abrasion alarm system as claimed in claim 1, characterized in that said pad is provided with a rear plate having a hole therein and said probe is inserted into the hole.

3. An abrasion alarm device as claimed in claim 2, characterized in that said probe is provided with a flange whose diameter is larger than that of the hole of said rear plate into which said probe is inserted, said flange being provided on the disk side of the hole in said rear plate.

4. An abrasion alarm device as claimed in any of claims 1 through 3, characterized in that said spring member is made of one sheet of metal plate.

5. An abrasion alarm device as claimed in any of claims 1 through 3, characterized in that said spring member has at its end portion a holding part adapted to hold electrical wires extending from said probe.

* * * * *